Figure 1:
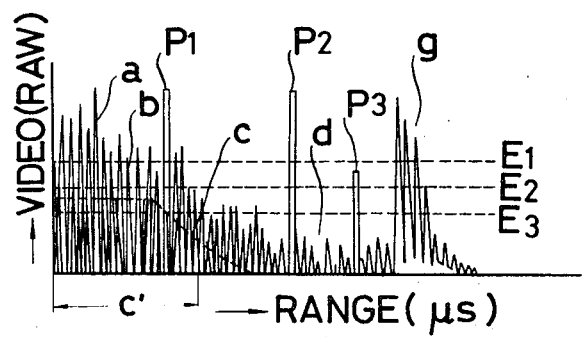

United States Patent [19]
Tsuruta et al.

[11] 3,806,923
[45] Apr. 23, 1974

[54] APPARATUS FOR REJECTING RADAR SIGNAL NOISES

[75] Inventors: Sueichi Tsuruta, Fujisawa; Kazunori Kitazumi, Chigasaki, both of Japan

[73] Assignee: Kyoritsu Dempa Co., Ltd., Tokyo, Japan

[22] Filed: Mar. 8, 1973

[21] Appl. No.: 339,429

[30] Foreign Application Priority Data
May 4, 1972  Japan.............................. 47-044334

[52] U.S. Cl.............................................. 343/7 A
[51] Int. Cl............................................... G01s 9/02
[58] Field of Search ................... 343/5 AGC, 7 A

[56] References Cited
UNITED STATES PATENTS
3,495,244  2/1970  La Rosa ..................... 343/5 AGC
3,719,942  3/1973  Herman et al. ................... 343/7 A Primary Examiner—Malcolm F. Hubler
Attorney, Agent, or Firm—Frank J. Jordan

[57] ABSTRACT

In a marine radar equipment, an apparatus for rejecting radar signal noises without missing targets which comprises, in combination, an automatic video level setting circuit, wave form selecting circuit and coincidence checking circuit. These circuits, in combination, are effective in rejecting white noises due to the nature of water waves and especially in preventing target signals from being masked by back scattering sea clutter noises generated in short distance regions when the sea is rough.

2 Claims, 15 Drawing Figures

(1)

(2)

(3)

(4)

(5)

(6)

(7)

APPARATUS FOR REJECTING RADAR SIGNAL NOISES

The present invention relates to an apparatus for rejecting noises from radar signals containing the noises and more particularly to an apparatus for rejecting scattered and relfected noise radio waves from reflected signals containing the noise radio waves which, when radio waves are radiated from a radar equipment towards an object or target on the surface of the sea, are produced from part of the radiated radio waves due to being influenced by water waves and will disturb the reflected signals to make the identification thereof difficult, thereby facilitating the detection of the target.

When radio waves in the form of a beam are radiated from a radar equipment towards a target on the surface of the sea, the radio waves will be reflected by the target to the equipmemt, accompanied with noise radio waves generated by the scattering and reflecting of part of the reflected radio waves due to the water waves (such noise radio waves being hereinafter referred to as sea clutter). The noises are generated by the reflection of part of the radiated radio waves by the water waves which complicatedly vary in height, wavelength, frequency, shape, etc. depending upon the sea state and have effects on the noises accordingly. However, it is the wind speed that has the greatest effects on the noises.

The noise radio waves generated by the scattering and reflecting, by the water waves, of part of the radio waves in the form of a beam radiated from the radar equipment arrive at the radar equipment through a complicated multipath propagation to cause the equipment to generate a combined or resultant video voltage and, thus, the wave form thereof is deemed to conform to a "random process".

In cases where radio waves in the form of a beam are radiated towards the surface of the sea in a rough state at a low grazing angle as in a marine radar, the received wave from exhibited at a short range is such that the white noises by capillary waves and random-process (near Rayleigh distributed) noises by wind waves are superposed one upon another thereby forming a composite noise, while the received wave form exhibits an increasingly predominant presence of the random-process noises as the range increases. The inside of a boundary, in which this change occurs, is referred to as a "transition range" and it increases as the wind speed is higher. When the surface of the sea is smooth during a radar operation, such noises reflected by the water waves are hardly generated whereby the detection of the target is not hindered. However, when the wind and sea are rough, the screen of the cathode ray tube (hereinafter referred to as C.R.T.) of the radar set will thoroughly be brightened or masked at the approximately control part occupying a nearly circular and relatively large area of the screen whereby the target to be detected in the screen is made quite obscure and consequentially difficult to detect.

Figure 2:
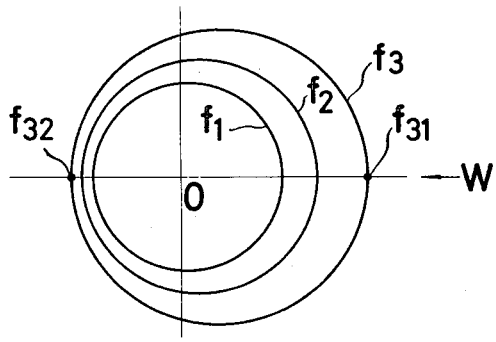

FIG. 1 is a diagram showing an example of target signals attended with sea clutter noises, while FIG. 2 is a contour map of sea clutter noise voltages.

Figure 3:
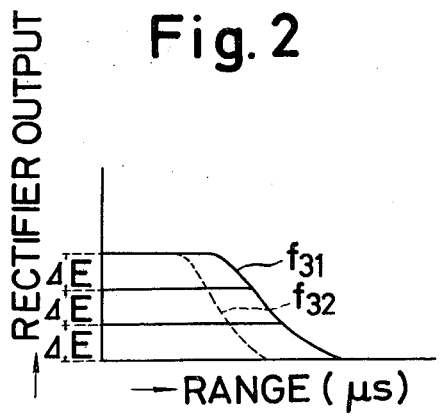
Figure 4:
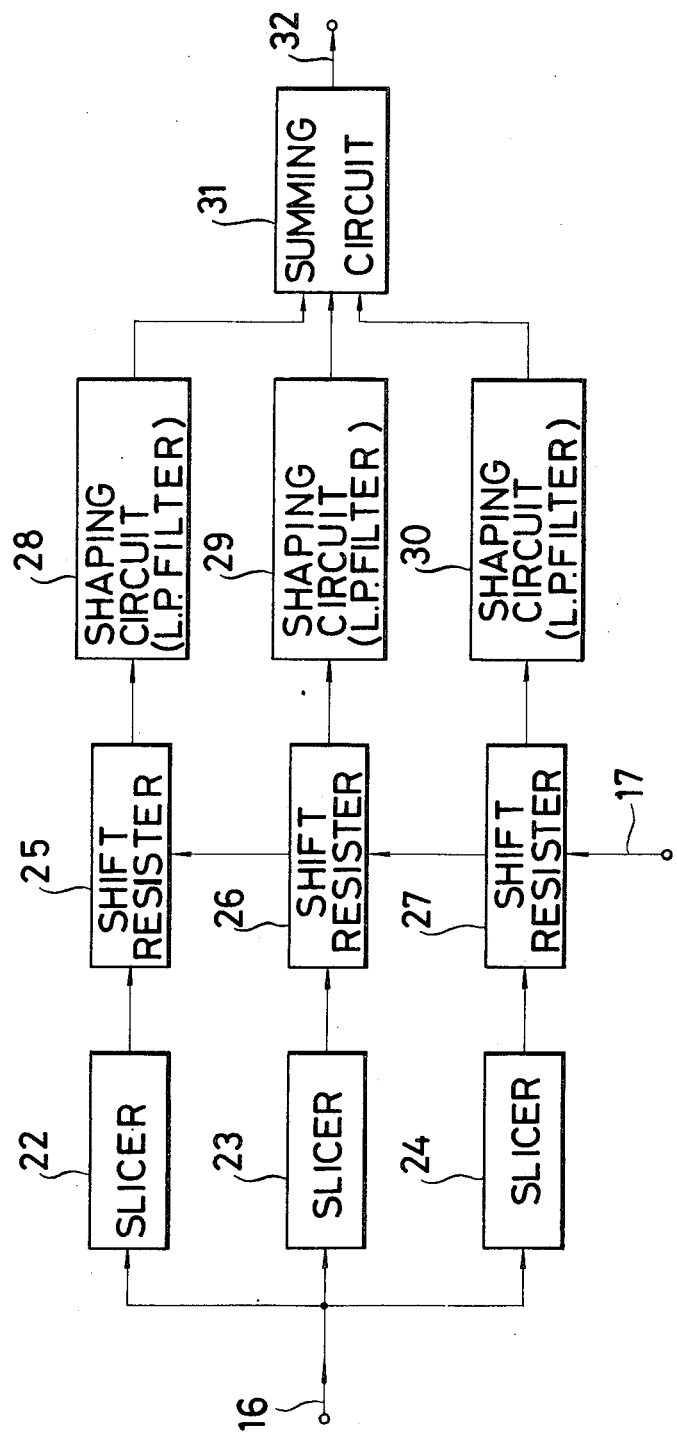
Figure 5:
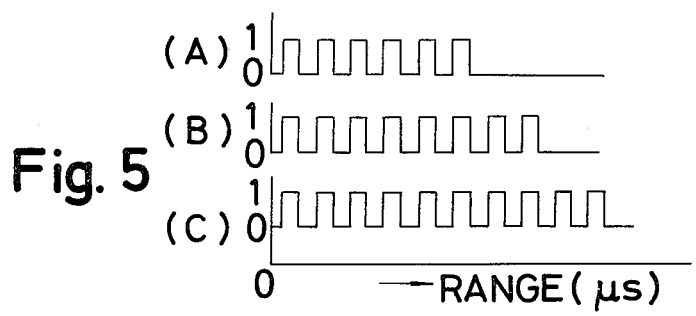
Figure 6:
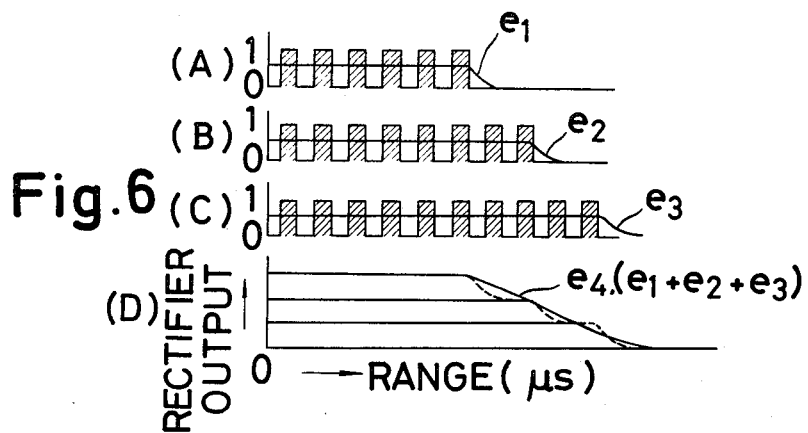
Figure 7:
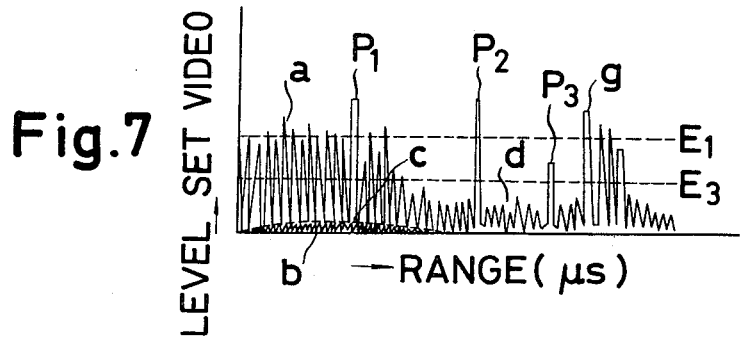
Figure 8:
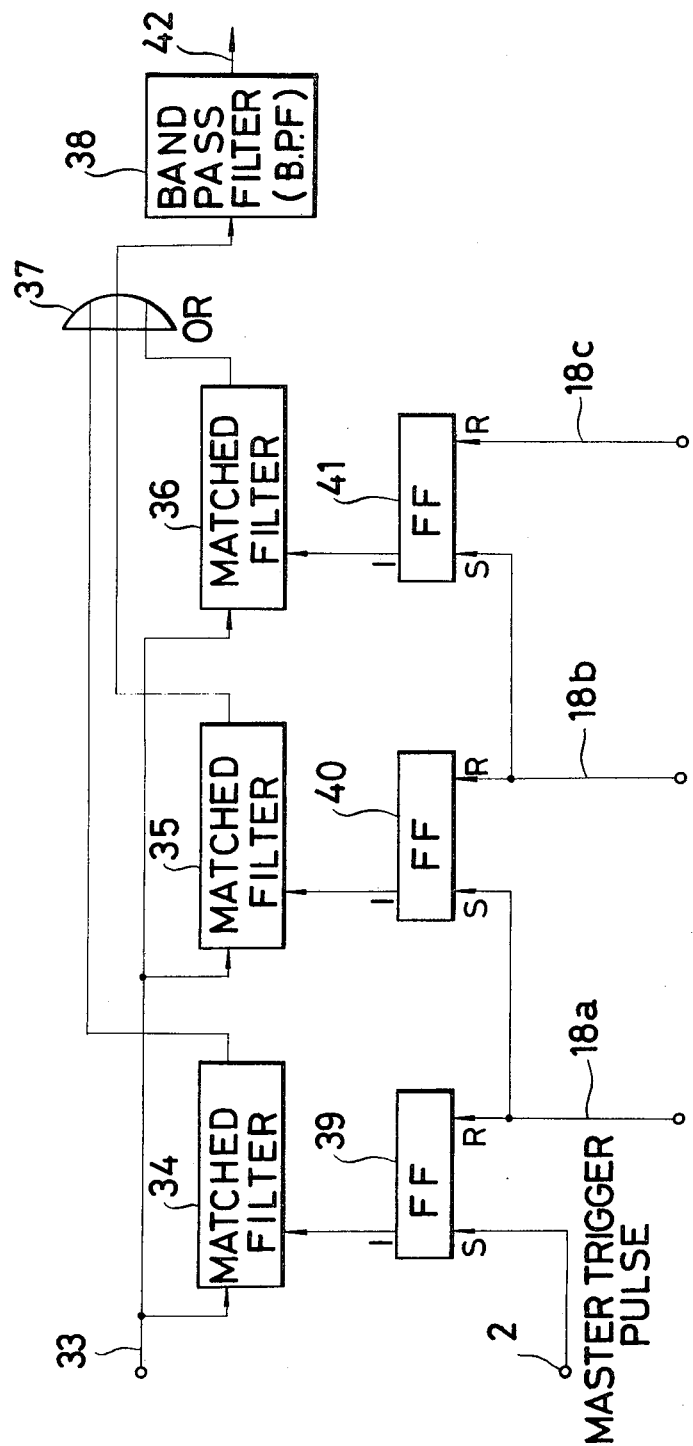
Figure 9:
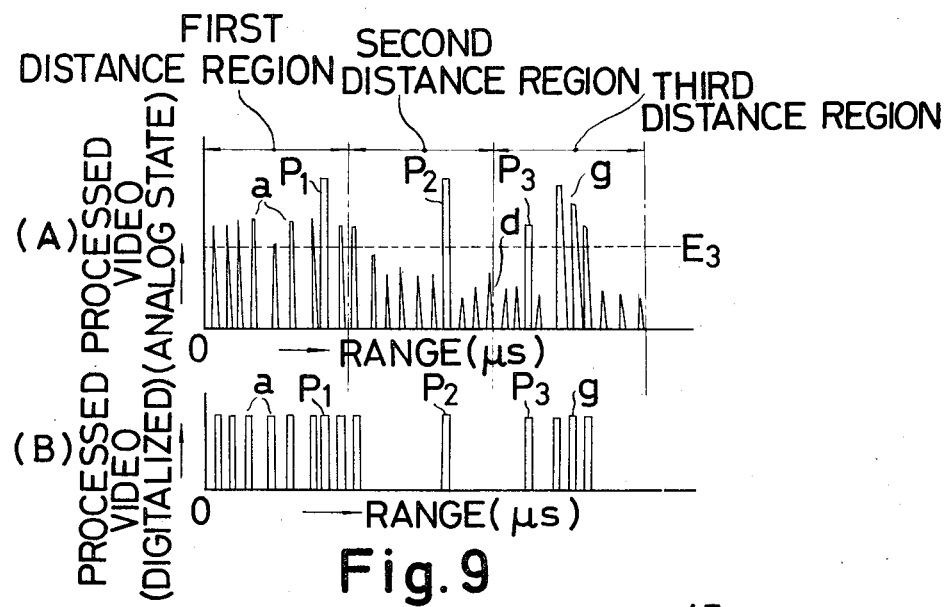
Figure 10:
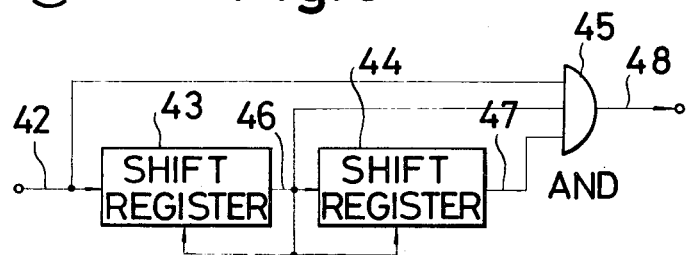
Figure 11:
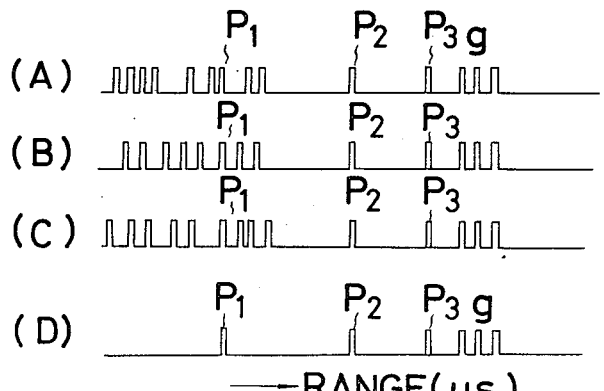
Figure 12:
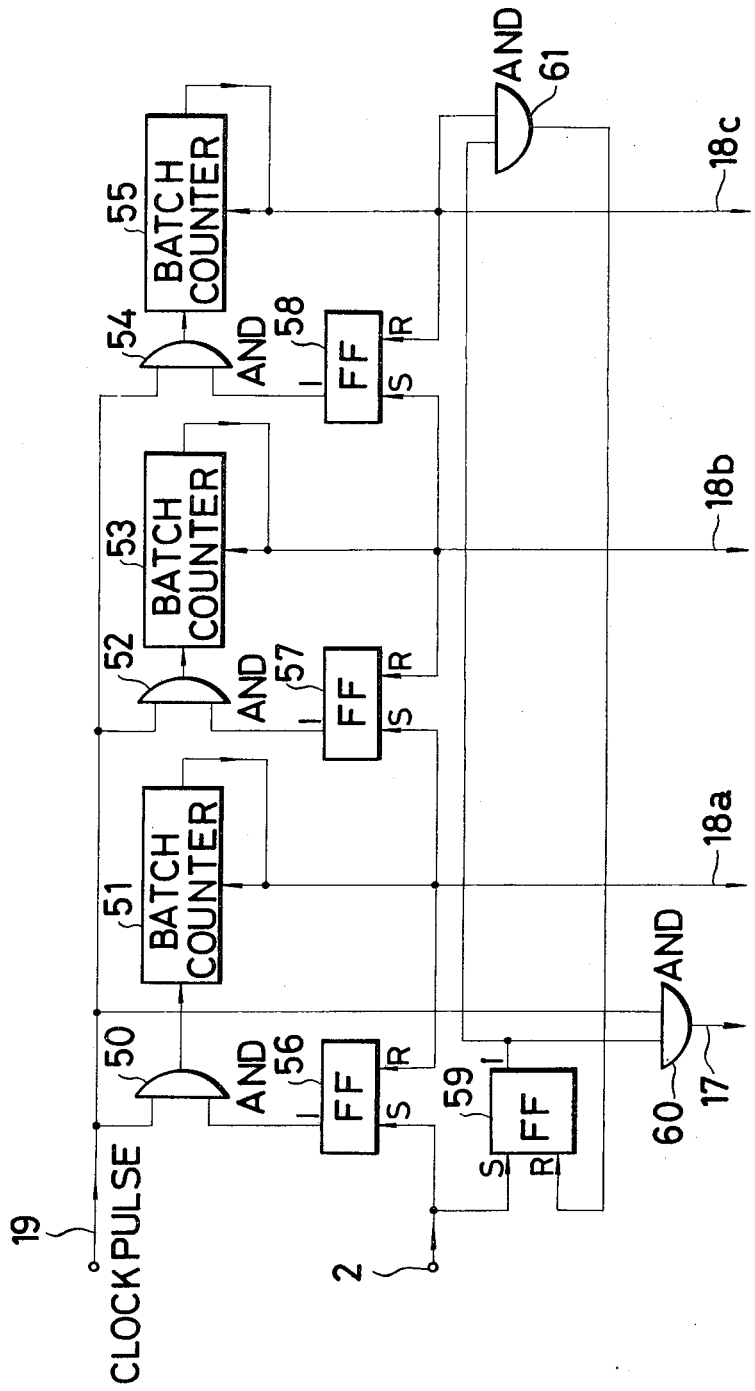
Figure 13:
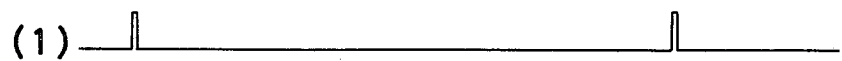
Figure 13:
Figure 13:
Figure 13:
Figure 13:
Figure 13:
Figure 13:

FIGS. 3 to 13 are diagrams showing embodiments of various elements constituting the present invention, among which FIG. 3 is a diagram for explaining the slicing of DC components of raw video signals, FIG. 4 is a block diagram of an AGC bias voltage generator circuit for level setting, FIGS. 5 and 6 are diagrams for explaining the operation of the circuit in FIG. 4, FIG. 7 is a diagram showing an example of raw video signals subjected to the level setting, FIG. 8 is a block diagram of a radar wave-form selecting circuit, FIG. 9 is a diagram for explaining the operation of the circuit in FIG. 8, FIG. 10 is a block diagram of a signal checking circuit, FIG. 11 is a diagram for explaining the operation of the circuit in FIG. 10, FIG. 12 is a block diagram of an instruction pulse generator circuit, and FIG. 13 is a time chart for explaining the operation of the circuit in FIG. 12.

Figure 14:
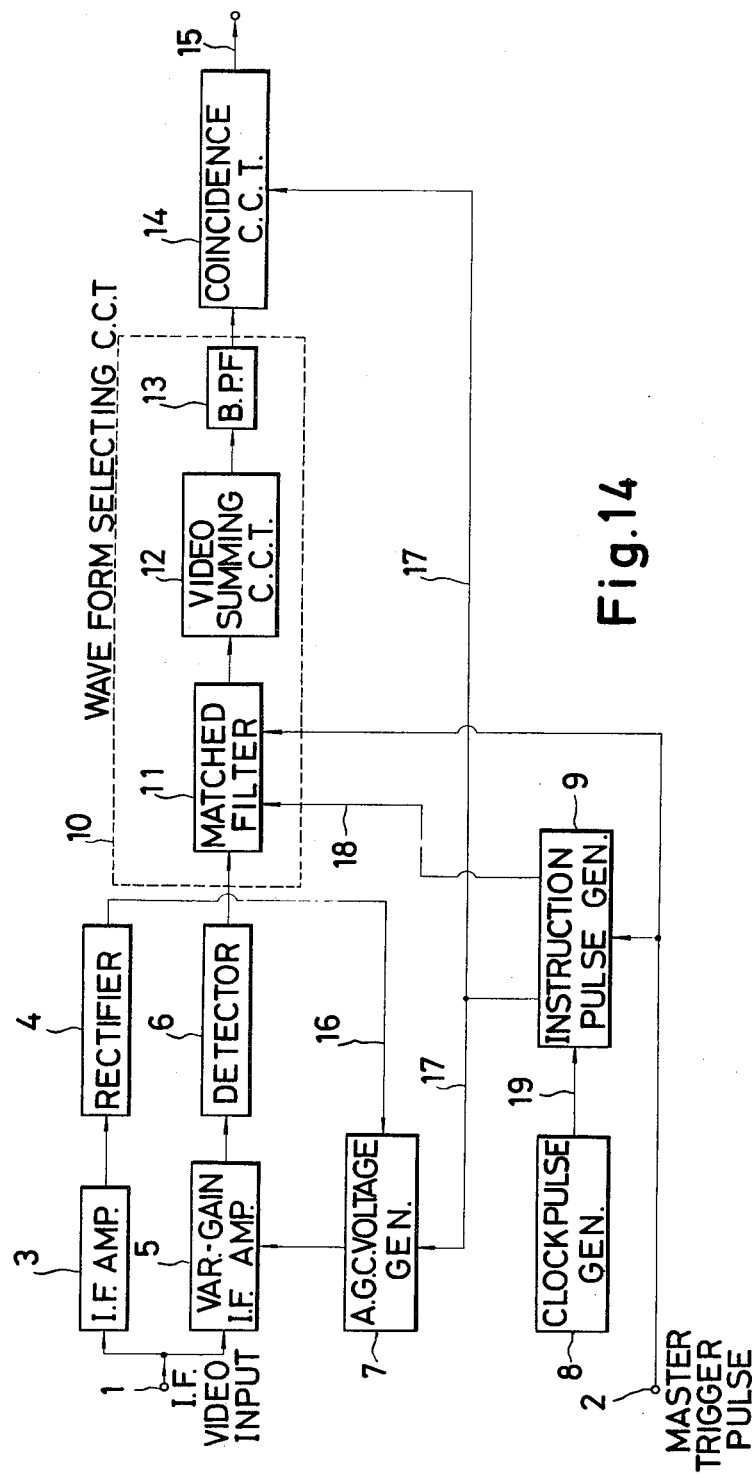
Figure 15:
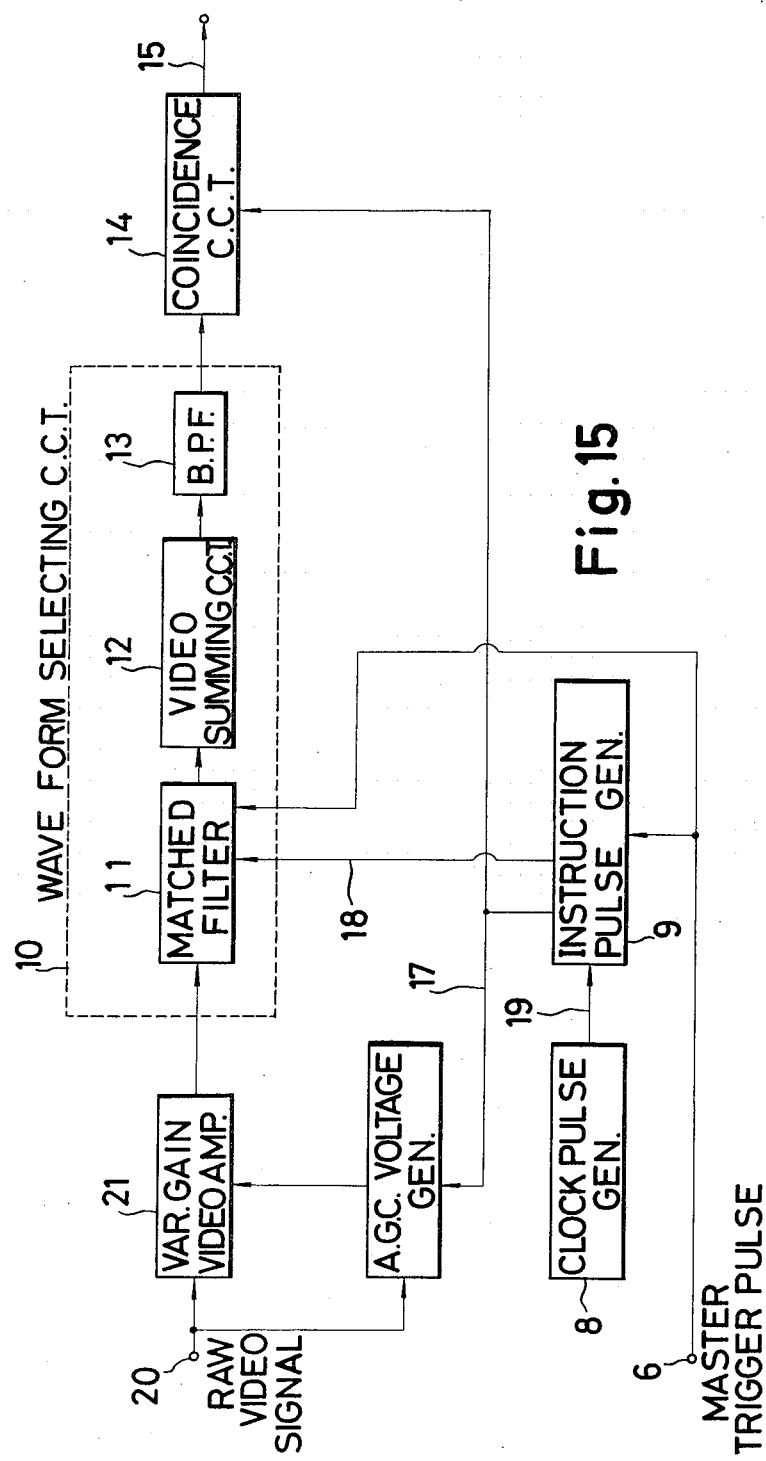

FIG. 14 is a general block diagram showing an embodiment of the present invention, while FIG. 15 is a general block diagram showing another embodiment of the present invention.

FIG. 1 shows an example of target signals accompanied with sea clutter noises. They are unprocessed or raw video signals obtained by detecting intermediate-frequency radar signals. The abscissa in the figure represents distances (corresponding to times $\mu S$ which radio waves take to propagate forth and back between a radar equipment radiating the radar waves and a target to be detected), while the ordinate represents detected signal voltages. In the figure, $P_1$, $P_2$ and $P_3$ indicate reflected signals from the target. The symbol $a$ designates sea clutter noises conforming to (residing in) a random process $b$ a portion where are concurrently present both sea clutter noises always existing as white noises and the above-mentioned random-process reflection noises, $c$ an envelope defining the boundary of the white noises, $c'$ a transition range, $d$ sea clutter noises at distances farther than the transition range, these noises being always present in the random-process manner, and $g$ reflections from a land which is still farther situated.

The displayed region in which the white noises are displayed to exist varies with a change of sea states, especially water waves, influenced by the wind speed and, in addition, varies depending upon a direction in which the wind blows, such as up-wind direction, down-wind direction or cross-wind direction. This is illustrated in FIG. 2 wherein the symbol 0 indicates the position of a radar as the original point and an arrow symbol "← W" a direction in which the wind blows. Assuming that transition ranges are represented by contour lines, they increase while changing from $f_1$ through $f_2$ to $f_3$ as the wind speed increases. The transition ranges greatly increase with the increase in wind speed in the up-wind direction, while they do not do so greatly in the down-wind direction.

In order to detect targets while suppressing such white noises, conventional radars have heretofore employed the system of S.T.C. (Sensitivity Time Control). The system increases the sensitivity of the radar exponentially in proportion to time lapsing since the radiation of radio waves by the radar. In the system, since the sensitivity is extremely lowered (to, for example, approximately −70dBm) at a very short distance between the radar and target to be detected, this is effective in suppressing the noises while suppressing even the target located at a short distance from the radar to thereby miss the target. Besides, since a uniform change in sensitivity is effected in the circumferential direction, noises are not entirely suppressed in all directions or azimuths when the wind blows at a high speed.

An object of the present invention is to provide an apparatus for rejecting noises thereby facilitating to detect a target and more particularly a noise rejecting apparatus for facilitating the detection of the target by suppressing the sensitivity correspondingly to the strength of white noises and for enhancing capability of distinguishing noises from reflected signals from the target by using the unique technique of selecting wave forms, even when the wind blows very hard and white noises generated are remarkably different in amount from each other depending on a direction in which the wind blows.

The object of the present invention is accomplished by the process comprising the following three means in combination:
1. Means to set video signal levels (the expression "to set" used herein meaning to suppress DC components of raw or unprocessed video signals).
2. Means to select target signals from sea clutter noises through wave forms thereof.
3. Means to reject random-process pulse state noises by checking coicidence method over several-time sweeps of the video signals. (This means is known.)

First, description will be made of the level setting of raw video signals. Referring again to FIG. 1, if a certain threshold voltage $E_1$ is set so that only voltages exceeding it may be displayed on a C.R.T., then only random-process noises $a$, target signals $P_1$ and $P_2$ and a land reflection $g$ are indicated. Since, in this case, $E_1$ is comparatively large, it is feared that a somewhat small target signal $P_3$ will be lost. If the threshold voltage is made as low as $E_2$ in order to display also the small target signal $P_3$ without losing it, targets such as $P_3$ can be displayed and on the other hand, the random-process noises are markedly increased in the display thereby making difficult the extraction of the target signals. Further, if the threshold voltage is lowered to such a level as $E_3$, the region within the transition range $C'$ will be heavily masked, thereby making the target signal $P_1$ perfectly painted and the extraction thereof impossible. Further, in this case, increased noises will be displayed even in the region outside the transition range $C'$ and hence, the confirmation of the target signal will be difficult. Since the white noises within the transition range $C'$ comprise DC component as indicated by the envelope $c$ after the detection, a digital statistic processing (in which, for example, the presence and absence of a signal are represented by "1" and "0", respectively) is impossible in the case of the threshold voltage $E_3$. Therefore, in order to conduct such digital statistic processing without missing even small target signals, it is required that at least the white noises are suppressed so as to leave non-suppressed the random-process noises and the target signals.

FIG. 3 shows the wave forms of the rectified DC voltage of unprocessed video signals in the case where there occur white noises corresponding to the contour line $f_3$ in FIG. 2. The DC-voltage wave forms can be regarded as being substantially the same as the white-noise envelope $c$ in FIG. 1. Noise voltages $f_{31}$ and $f_{32}$ in the up-wind and down-wind directions of the contour line $f_3$ in FIG. 2 correspond to a full line $f_{31}$ and a dotted line $f_{32}$ in FIG. 3, respectively. The noises on the contour line $f_3$ in other directions or azimuths lie between the full line $f_{31}$ and the dotted line $f_{32}$. To suppress the DC-voltage wave forms so as to make them almost nil or zero, can be attained by applying bias voltages corresponding to the DC voltages in the respective angular directions or azimuths at the stage of variable-gain intermediate-frequency amplifier or the stage of variable-gain video amplifier after detection.

FIG. 4 shows a block diagram of an AGC bias voltage generating circuit for effecting the level setting. Referring to the figure, an input signal 16 is the DC component of a video signal as obtained by rectifying the intermediate-frequency video signal, and is applied to several (three in the figure) slicers 22, 23 and 24. The slicers slice the DC voltage of the video signal, namely, a component substantially corresponding to the envelope of white noises in the video signal, at the respective slice levels $\Delta E$, $2 \Delta E$ and $3 \Delta E$ as illustrated in FIG. 3.

The outputs of the slicers 22, 23 and 24 are respectively fed to shift registers 25, 26 and 27, they are digitalized (for example, "1" being for the presence of the output of the slicer, while "0" for the absence thereof) under the control of clock pulses for distance counting which are applied during the sweep period, and they are registered while being sequentially shifted. Each of the shift registers is made up of the same number of clock pulses generated during a time from the initiation of generation of master trigger pulse to the arrival of said pulses at a range to be swept. With the shift register, storage and read-out are simultaneously performed at the input end and output end thereof. When the register shifts the clock pulses over the maximum distance to be swept, it ceases its operation and waits for the next sweep initiation. This is shown in FIG. 5. (A), (B) and (C) in the figure illustrate pulses corresponding to the DC-component voltages stored in the shift registers 25, 26 and 27, respectively. The pulses stored in the shift registers are successively read out by the distance clock pulses generated at the next sweep initiation. The read-out pulses are fed to the respective corresponding shaping circuits 28, 29 and 30, to be shaped into DC wave forms after passed through low-pass filter. The shaped outputs are combined in a summing circuit 31. This is shown in FIG. 6. (A), (B) and (C) in the figure illustrate DC wave forms $e_1$, $e_2$ and $e_3$ obtained by shaping the pulse wave forms in the shaping circuits 28, 29 and 30, repectively, while (D) represents a manner in which a combined output voltage $e_4$ is formed by summing the DC wave forms $e_1$, $e_2$ and $e_3$. The combined voltage $e_4$ is applied as an AGC bias to an intermediate-frequency amplifier or video amplifier of variable gain in the radar equipment, whereby level set video signals with suppressed DC components corresponding to the envelope of the white noises can be produced. FIG. 7 shows level set video signals obtained by suppressing the part of the white noises in the raw video signals in FIG. 1 to get said part almost lost while leaving intact only the target signals, the land echo and the random-process noises. The same parts as in FIG. 1 are indicated by the same symbols. In the case of FIG. 1 before the level setting, when the threshold voltage of signals to be displayed on the C.R.T. is $E_3$ which is the lowest value herein, the target signal $P_3$ cannot be confirmed. In contrast, in the case of FIG. 7 after the level setting, it can be extracted. That is, even small target signals can also be extracted.

Description will now be made of the means to select target signals and noises through composite wave forms, the means being the second one necessary for accomplishing the object of the present invention. When the wave form of raw or unprocessed video signals is observed under the condition that the time on the abscissa is extended to the order of microsecond, the target signal is a square wave whose rise is abrupt and whose fall is comparatively gentle, while the noises are distorted waves which are deemed to be composed at random of a number of quasi-sinusoidal waves, and marked points of peculiarity are not observed. The pulse duration of the target signal is characterized by being generally wide in comparison with the half-wavelength of the sinusoidal wave of a frequency component of the maximum energy spectrum in the noise components. The target signal has the property that, as the distance from the radar station becomes longer, the pulse width becomes somewhat narrower. In addition, since the grazing angle to the surface of the sea from the radar antenna becomes gradually smaller, the noises exhibit the tendency that the random distribution state of the principal frequency components becomes gradually coarser.

The wave form selecting means of the present invention utilizes the distribution characteristics of the target signal and noises under analog states employing the distance as a parameter as described above, separates the signal and noises by wave form discrimination, and accept only the target signal. A block diagram of the circuit arrangement of this means is shown in FIG. 8. Referring to the figure, an input signal 33 consists of raw video signals subjected to the level setting (signals as in FIG. 7). Numerals 34, 35 and 36 designate matched filters which are known. The matched filter is one which is in an inversely functional relation to the wave form of the target signal, and it has the property of allowing the wave form of the target signal to pass therethrough most conveniently and preventing the wave forms of other different signals from passing therethrough. As the matched filter, there are, for example, a self-correlation filter, a cross-correlation filter, and an optimum filter. All of them are circuits which extract the target signals from video signals composed of a mixture of the target signals and noises, by making use of the different wave forms of the signals between the noises. In order to impart extracting capabilities meeting the distances between targets to be detected and the radar equipment, there are provided matched filters of respectively having different characteristics corresponding to distance range regions. They are so connected as to be sequentially operated such that the matched filter 34 is used for the first distance region, the matched filter 35 for the next distance region, and the matched filter 36 for the subsequent distance region. To provide the matched filters adapted for the respective distance regions, is realizable in the following way. In case of the auto-correlation filter, the delay time is varied depending on the distance between the radar and target. In case of the cross-correlation filter, the pulse duration is varied depending on the distance. In case of the optimum filter, a circuit constant is varied depending on the distance. Numeral 38 designates a band-pass or low-pass filter, 39, 40 and 41 flip-flops (hereinbelow denoted by FF), respectively, the numeral 2 a master trigger pulse-input terminal, and 18a, 18b and 18c range gate pulses corresponding to the distance regions, respectively.

There will now be explained the operation of the wave form discriminating circuit in FIG. 8. When the master trigger pulse is applied to the terminal 2, FF 39 is set, and its output actuates the matched filter 34 for the first distance region. For the next distance region is reached, FF 39 is reset by application of the range gate pulse 18a, and the operation of the matched filter 34 is stopped. Simultaneously therewith, FF 40 is set and its output starts the operation of the matched filter 35. For the subsequent region is reached, FF40 is provided with the range gate pulse 18b to be reset, and the operation of the matched filter 35 is stopped. At the same time, FF 41 is set and its output starts the operation of the matched filter 36. Upon completion of the operations for all the distance regions, the range gate pulse 18c is impressed to reset FF 41 and to accordingly stop the operation of the matched filter 36. The above operations are repeated by a sweep whose starting point is master trigger pulse at the succeeding radiation of radio waves. In the matched filters 34, 35 and 36, the wave form selection is first performed in the analog state. Then, as in a wave form shown in FIG. 9(A), noises are markedly rejected in comparison with those of the wave form in FIG. 7. Further, pulse voltages exceeding the threshold voltage $E_3$ are taken out (signal voltages are digitalized so that those above the threshold value may be represented by "1", while those below the same may be indicated by "0"). The digitalized wave form is illustrated in FIG. 9(B). The wave form of (B) has the noises greatly rejected as compared with the wave form of (A). The outputs of the respective matched filters are fed to an OR circuit 37 sequentially. The output of the OR circuit is delivered as a digital video signal output 42 via the filter 38 to a processing circuit at the next stage.

Description will now be made of the means to eliminate noises existing in a random-process manner, the means being the third one necessary for accomplishing the object of the present invention. It is known that the separation between noises scattered at times (distances) in the way of random process and target signals existing at fixed times (distances) can be performed by a method wherein digitalized video signals obtained by sweeps on a certain antenna aspect are checked continuously several times and wherein signals existing consistently in all the checks are identified and accepted, whereas signals not existing consistently are rejected. The principle will be briefly explained with reference to FIGS. 10 and 11. FIG. 10 is a block diagram of a circuit arrangement for the method. The digitalized video signals 42 of the first sweep are applied to a shift register 43, and simultaneously to an AND circuit 45. The video signals 42 are applied in synchronism with clock pulses 17 which are impressed during the sweep period. The shift register 43 also stores and shifts its contents in synchronism with the clock pulses 17. When the video signals corresponding to all the clock pulses in the sweep period have been stored, the shift is stopped, and the next sweep is waited for. When the second sweep is started, the video signals of this sweep are fed to the AND circuit 45 and the shift register 43, to initiate storage. Simultaneously therewith, the video signals 46 having been stored at the first time are read out from the shift register 43 and are applied to the AND circuit 45 and a succeeding shift register 44, to initiate storage at the same time. When, at this time of sweep, the video signals corresponding to all of the clock pulses in the sweep interval have been stored in the shift register 43 and the video signals of the previous sweep have been stored in the shift register 44, the shift is stopped, and the next sweep is awaited. When the third sweep is started, the video signals of this time are fed to the AND circuit 45 and the shift register 43, in which the storage of these signals and the read-out of the video signals of the second sweep are simultaneously carried out while both the signals are being shifted. The signals 46 read out are applied to the AND circuit 45 and the shift register 44, in which they are stored. Simultaneously, video signals 47 of the first time are read out, and applied to the AND circuit 45 while being shifted. In this manner, the video signals obtained at the first, second and third times are simultaneously applied to the AND circuit 45 while held in synchronism. Since outputs of logical products are derived herein, target signals existent at fixed distances are accepted; while noise pulses existent at distances in a random distance are rejected, whereby the video signal outputs remain composed only of the target signals. After the third sweep, only the target signals are accepted as the foregoing progress is being repeated to reject the noises.

FIG. 11 shows the time chart for the progress of extraction from the noise pulses and the cohered target signals, both being digitalized. (A) in the figure illustrates the wave form of the third time of video signals 42 applied to the signal coincidence circuit in FIG. 10, (B) the wave form of the second sweep of video signals 46 stored in the shift register 43 and read out therefrom, and (C) the wave form of the first time of video signals 47 stored in the shift register 44 and read out therefrom. (D) illustrates the wave form of accepted video signals in the case where all the video signals corresponding to the three sweeps are applied to the AND circuits 45 and processed by the logical product.

In order to operate the respective processing circuits in the present invention in good order, it is necessary to prepare a variety of instruction pulses and to supply them to the respectively corresponding circuits. A block diagram of a generator circuit for such instruction pulses is shown in FIG. 12. Referring to the figure, numeral 19 designates distance clock pulses (hereinafter abbreviated to CP). The circuitry is normally supplied with CP 19, and has its operation started in the following sequence for the first time when it receives the master trigger pulse 2 at the time of the radiation of radio waves.

When the master trigger pulse 2 is received, FF (flip-flop) 59 is started, to open AND gates 60 and 61 by means of the output thereof. At the same time, FF 56 is started, to open an AND gate 50 by means of the output thereof. The counting of a batch counter 51 is initiated by CP 19 having passed through the gate 50. The batch counter 51 is constructed such that, upon completion of counting of the number of pulses as required for the first distance region, it is reset by the output. The output is transmitted as the distance region pulse 18a, to simultaneously reset FF 56 to close the AND gate 50. In addition, it starts FF 57 for the next distance region. An AND gate 52 is opened by the output of FF 57, and CP's 19 having passed through the gate 52 start to be counted by a batch counter 53. As soon as the counting of the number of pulses as required for this distance region is completed, the counting operation of the counter 53 is stopped by the output, and the output is transmitted as the distance region gate pulse 18b. Simultaneously therewith, it resets FF 57 to close an AND gate 52, and starts FF 58 for the next distance stage. An AND gate 54 is opened by the output of FF 58. CP's 19 having passed therethrough start to be counted by a batch counter 55. Upon completion of counting of the number of pulses as required for this distance region, the counting operation is stopped by the output. The output is transmitted as the distance region gate pulse 18c. Simultaneously therewith, it resets FF 58 to close the AND gate 54. In addition, it passes through an AND gate 61, to reset FF 59. An AND gate 60 is opened by the output of FF 59 having started upon reception of the master trigger pulse 2, and allows CP's 19 to pass therethrough until it is closed after the generation of the distance region gate pulse 18c. That is, the AND gate 60 has the function of delivering gated clock pulses (GCP) corresponding to the total pulses of all the distance regions.

FIG. 13 shows a time chart of the various instruction pulses. (1) in the figure illustrates the master trigger pulses 2 each indicating the time of the radiation of radio waves. (2) shows CP's 19. (3) depicts the output wave form of FF 56, (4) the output wave form of FF 57, (5) the output wave form of FF 58, (6) the output wave form of FF 59, and (7) the gated clock pulses (GCP) having passed through the AND gate 60.

Description has thus far been made of the three means for accomplishing the object of the present invention, and the circuitry for preparing the various instruction pulses which serve to operate the respective processing circuits in the means in good order. A block diagram of an embodiment of the present invention as includes these means, is shown in FIG. 14. Intermediate-frequency video signal inputs from a radar receiver are entered from a terminal 1, and are applied to an intermediate-frequency amplifier 3 and an intermediate-frequency amplifier of variable gain 5. The video signals amplified in the intermediate-frequency amplifier 3 have their DC component (of substantially the same shape as that of the envelope of white noises in the video signals) extracted in a rectifier circuit 4. The DC component 16 is applied to an AGC voltage generator circuit 7. As already described in detail, the AGC voltage generator circuit is made up of the arrangement in FIG. 4. The output voltage of the generator circuit 7 falls into the wave form as shown in FIG. 6(D), and is supplied as the AGC bias voltage of the intermediate-frequency amplifier 5. The video signal inputs applied to the intermediate-frequency amplifier 5 are amplified under the state under which the DC component corresponding to the envelope of the white noises contained therein is suppressed by the bias voltage for AGC. On being detected in a detector circuit 6 at the next stage, video signals subjected to level setting as shown in FIG. 7 are provided at the output of the detector 6. The output is fed to a wave-form selecting circuit 10, and is processed therein. As already described in detail, the wave-form selecting circuit 10 is composed of a distance region matching filter 11, a video adder 12 and a filter 13. The output of the discriminator 10 becomes digitalized video signals as in FIG. 9(B), and is delivered to a signal coincidence circuit 14 at the next stage.

The signal coincidence circuit 14 is known. As already explained with reference to FIGS. 10 and 11, video signals having the sea clutter noises rejected and consisting only of the fixed target signals can be accepted by means of the circuit 14.

In the apparatus of the embodiment, the AGC voltage generator circuit 7, wave-form selecting circuit 10 and signal coincidence circuit 14 are driven by application of the master trigger pulse from a terminal 2, and are operated by the various instruction pulses synchronized with CP's 19 from a clock pulse generator 8. The instruction pulses are composed in an instruction pulse generator 9, and are obtained in the form of the gated clock pulses (GCP) 17 and distance stage gate pulses 18 (18a, 18b and 18c). The particulars have been already described in detail with reference to FIGS. 12 and 13.

Since the apparatus shown in FIG. 14 receives as inputs the intermediate-frequency video signals of the radar receiver, the circuit of the stage of the intermediate-frequency amplification need be provided in the apparatus. However, it has the great advantage that no distortion occurs in the wave form of the output.

FIG. 15 shows a block diagram of another embodiment of the present invention. The embodiment is of a simplified form of the previous embodiment in FIG. 14, and can dispense with the intermediate-frequency amplification stage as detected video signals of the radar receiver are inputted thereto. However, since the level setting of the detected video signals is conducted, the apparatus is disadvantageous in bringing about slight distortion in the wave form of the output. In FIG. 15, the same parts as in FIG. 14 are assigned with the same symbols. The video signals detected in the radar receiver are supplied from a terminal 20, and are applied to a variable-gain video amplifier 21 and the AGC voltage generator circuit 7. Suitable as the variable-gain video amplifier 21 is one having such property that the gain decreases with increase in the bias voltage, and is, for example, a logarithmic amplifier. In the AGC voltage generator circuit 7, a DC component equivalent to the envelope of white noises in the detected video signals is sliced to digitalize signal voltages in a manner substantially the same as in the case of FIG. 14. The digitalized signal voltages are applied to the video amplifier 21 as AGC bias voltages. The other construction and operation are the same as in the case of FIG. 14.

As regards the construction of the present invention, the foregoing embodiments have been described as comprising in combination all the three means of the video signal level-selecting means, the wave-form selecting means and the signal coincidence means. However, even if the wave-form selecting means among the three means is dispensed with, the apparatus can be put into practical use as a simplified system.

As described above, in accordance with the present invention, apparatus of a simple circuit arrangement is utilized for a marine radar receiver equipment, whereby an epoch-making target-signal extracting performance as compared with the performance of the prior-art receiver equipment can be attained.

What is claimed is:

1. In a receiver of a marine radar equipment, radar signal noise rejection processing apparatus comprising: a circuit which rectifies intermediate-frequency video signal supplied from an intermediate-frequency amplification stage of said receiver, thereby to obtain a DC component corresponding to an envelope of white noises contained in said complex signals; an AGC bias voltage generator circuit which includes M (several) circuits which slice said DC component with M stages of voltage levels, sample the respective sliced outputs at every distance corresponding to a period of clock pulses and turn them into digitalized signals in the binary number based on the presence and absence of signals, M shift registers which write and store, shift, and read out and output said digitalized signals of the respective stages over the entire distance ranges for one sweep period under control of said clock pulses, M shaping circuits which shape the digitalized pulse outputs read out from the respective shift registers, thereby to turn them into a DC output form of an analog quantity, and a summing circuit which combines outputs of the respective shaping circuits in level, to prepare a bias voltage for AGC; a variable-gain intermediate-frequency amplifier which has its gain controlled by the output voltage of said AGC bias voltage generator circuit and which amplifies said intermediate-frequency video signals; a detector circuit which detects an output of said variable-gain intermediate-frequency amplifier into video signals; a signal checking circuit, being known, in which slices the video signal outputs of said detector circuit with a fixed threshold value, to eliminate noises below the value and thereafter turn said video signal outputs into digitalized signals in the binary number based on the presence and absence of signals, and which extracts from among said digitalized signals only those consistently existing at identical distances every time in several times of sweeps; a circuit which generates said clock pulses having the period corresponding to a unit distance; and an instruction pulse generator circuit which is started by a master trigger pulse of said radar equipment and is synchronized with said clock pulses, and which generates gated clock pulses transmitted only during a sweep period and distance gate pulses indicating completions of respective distance regions with the whole sweep distance divided into N (several) regions.

2. The radar signal noise rejection processing apparatus according to claim 1, characterized in that a wave-form discriminating circuit is connected between said detector circuit and said signal checking circuit, said wave-form discriminating circuit comprising N matched filters which have target-signal extracting characteristics adapted for said respective distance regions with the whole sweep distance divided into N stages and which serve to extract target signals at said respective distance regions of said video signals of said detector circuit, and a circuit which adds the outputs of said N matched filters in distance.

* * * * *